United States Patent Office 3,635,869
Patented Jan. 18, 1972

3,635,869
CATALYSIS OF EPOXY RESIN/CARBOXYLIC ACID SYSTEMS WITH TRIVALENT CHROMIUM III TRICARBOXYLATE SALTS
Roger B. Steele, Fair Oaks, and Arthur Katzakian, Jr., and Joseph J. Scigliano, Sacramento, Calif., and Jude W. Barry, Beaverton, Oreg., assignors to Aerojet-General Corporation, El Monte, Calif.
No Drawing. Filed Mar. 16, 1970, Ser. No. 20,053
Int. Cl. C08g 51/26, 51/34
U.S. Cl. 260—30.4 EP
9 Claims

ABSTRACT OF THE DISCLOSURE

This patent describes a novel storable epoxy resin system comprising a curable epoxy resin and a carboxylic acid or acid anhydride; the improvement wherein the system is provided with a chromium III tricarboxylate salt catalyst adapted to contain unoccupied coordination sites, deactivated with certain non-reactive, volatile, coordinating, electron donating solvents including methanol, ethanol, N,N-dimethylformamide, dioxane, tetrahydrofuran, dimethyl sulfoxide, dimethyl sulfolane, nitro alkanes, nitro aromatics, tetramethyl urea, N,N-dimethylacetamide, N-methylcaprolactam and N-methyl pyrollidone which solvent evaporates upon the application of the composition to a surface to reactivate the catalyst by the formation of occupied coordination sites, and resulting in reaction of the epoxy compound with the carboxylic acid or acid anhydride.

BACKGROUND OF THE INVENTION

Various types of epoxy coating and adhesive systems have been proposed. For the most part, these systems require the addition of the catalyst and/or the curing agent to the epoxy resin just prior to use since earlier addition would result in the curing of the resin. For the most part, the known epoxy resin catalysts are not storage stable in the presence of uncured epoxy resin and it is this factor which necessitates the two components system referred to above. The disadvantage of the two component system is the necessity for double packaging and the inconvenience associated with blending the two packages just prior to use. Therefore, there has been a long felt need in the epoxy resin art for a storage stable one package epoxy resin system which upon application will properly form a hard epoxy resin coating or adhesive. The present invention, it is believed, for the first time fulfills this need which has long existed in the art. This invention facilitates the use of epoxy-acid systems as paints, coatings and adhesives since errors due to poor mixing at the application site are eliminated.

SUMMARY OF THE INVENTION

Briefly, the present invention comprises a novel storable epoxy resin system comprising a curable epoxy resin and a carboxylic acid or acid anhydride; the improvement wherein the system is provided with a chromium III carboxylate catalyst deactivated (fully coordinated) with a non-reactive, volatile, coordinating, electron donating solvent, which solvent evaporates upon the application of the composition to a surface reactivating the catalyst by the formation of unoccupied coordination sites, and resulting in reaction of the epoxy compound with the carboxylic acid or acid anhydride.

Illustrative examples of such solvents are methanol, ethanol, N,N-dimethyl formamide, dioxane, tetrahydrofuran, dimethyl sulfoxide, dimethyl sulfolane, nitro alkanes, nitro aromatics, tetramethyl urea, N,N-dimethylacetamide, N-methylcaprolactam and N-methyl pyrollidone.

It is an object of the present invention to provide a novel storable epoxy resin system.

Another object of the present invention is to provide a single package curable epoxy resin system.

A further object of the present invention is to provide a novel method for the storage of curable epoxy resin systems for prolonged periods without curing.

These and other objects and advantages of this invention will be apparent from the more detailed description which follows.

DESCRIPTION OF PREFERRED EMBODIMENTS

In the practice of the invention, the fully coordinated chromium III tricarboxylate salt is simply mixed in an effective catalytic amount, of from about 0.1 to about 10% by weight of the resin system, with an epoxy resin and an organic carboxylic acid or anhydride. Since the trivalent chrominum III of the catalyst governs, at least to some extent, the amount of catalyst required to cure any system in a given time, the weight amount of the lower molecular weight catalysts used is generally less than is required when the high molecular weight compounds are employed.

Preferably, this invention comprehends a stoichiometric combination of a carboxylic acid or acid anhydride and an epoxide containing resins, both having greater than monofunctionality, with a catalytic amount of a chromic ion salt all combined in a solvent capable of coordinating the chromium III salt. The fully coordinated chromium III has no catalytic activity in this system. Catalytic activity occurs, however, after the composition has been applied to a surface, whereupon the solvent evaporates. The chromium III then becomes wholly or partially uncoordinated in which state it is highly catalytic toward this reaction. A wide variety of solvents provide deactivation of these catalysts to varying degrees. Generally these are derived from the class called electron donating solvents. By way of example only, the following illustrate this class: N,N-dimethylformamide, tetrahydrofuran, methanol, ethanol, dioxane, dimethyl sulfoxide, dimethyl sulfolane, nitro alkanes, nitro aromatics, tettramethyl urea, N-,N-dimethylacetamide, N-methylacaprolactam and N-methyl pyrollidone.

The advantages of the present invention have been found to be obtained using any soluble trivalent chromium III tricarboxylate salt containing unoccupied coordination sites, all of which are capable of reversible coordination by the solvents discussed above. Typical of such compounds are trivalent chromium hexanoate, trivalent chromium pentanoate, trivalent chromium butyrate, trivalent chromium 2-ethyl-hexanoate, trivalent chomium decanoate, trivalent chromium oleate, trivalent chromium 2-octenoate, trivalent chromium toluate, trivalent chromium cresylate, trivalent chromium benzoate, trivalent chromium alkylbenzoates, trivalent chromium alkoxybenzoates, trivalent chromium naphthenates and trivalent chromium alkoxide. Generally, although not necessarily, the dehydrated trivalent chromium catalysts of our invention contain from 6 to about 60 carbon atoms. We have found that these catalysts are at least somewhat soluble in the epoxy resin system. This solubility is essential to the effectiveness of the catalyst. However, the exact degree of solubility is not critical. The preparation of the active trivalent chromium III tricarboxylate salts containing unoccupied coordination sites is described in assignee's co-pending application Ser. No. 4,056, filed Jan. 19, 1970, the disclosure of which is expressly incorporated herein by reference.

The epoxy resins which may be used in the practice of this invention include any of those materials familiar to those skilled in the art. Typical epoxy resins suitable in the practice of the present invention are those disclosed in U.S. Pats. No. 2,500,600 and 2,324,483, the disclosures of which are expressly incorporated herein by reference. While not limited thereto, the epoxy resins of the present invention normally have epoxy equivalent weight values of from about 100 up to 4000 or higher. The more common types of epoxy resins are the reaction products of epichlorhydrin and 2,2-di(p-hydroxyphenyl)propane, the glycidyl ether of mononuclear di- and trihydroxy phenols (resorcinol, hydroquinone, pyrocatechol, saligenin and phologlucinol), the glycidyl ether of other polyhydroxyl phenols (Bisphenol F, trihydroxyldiphenyl dimethyl methane, 4,4'-dihydroxy biphenyl, tetrakis (hydroxyphenyl) ethane, long-chain bisphenols, dihydroxy diphenyl sulfone, and Novolacs), the glycidyl ethers of polyalcohols (ethylene glycol, 1,4-butanediol, glycerol, erythritol, and polyglycols), and the epoxylated cyclic and straight chain olefins (vinyl cyclohexene, dicyclohexene carboxylate, and polybutadienes). These and many other epoxy resins are available commercially, for example, under the trade name "Epon Resins" from the Shell Chemicals Company, "Araldrite Resins" from the Ciba Company, "DER Resins" from the Dow Chemical Company and "Unox Epoxides" from Union Carbide Chemicals Company.

Simply by way of illustration and not by way of limitation, the organic polybasic acids and anhydrides which may be employed in the practice of the present invention include oxalic acid, malonic acid, succinic acid, glutraic acid, adipic acid, pimelic acid, azelaic acid, sebacic acid, brassylic acid, dimer fatty acid, trimer fatty acid and the polyester diacids, such as the diacid from an excess of azelaic acid and neopentyl glycol sold under the trade name "1025–107" by Emery Chemical Company and having an equivalent weight of 500. Typical anhydrides include phthalic anhydride, maleic anhydride, hexahydrophthalic anhydride, pyromellitic dianhydride, dodecenyl succinic anhydride, dichloromaleic anhydride and chlorendic anhydride as well as linear or cyclic anhydrides of any of the above listed acids.

The volatile solvent used to coordinate the catalyst must be non-reactive with the components of the epoxy resin system. Thus, for example, methanol is reactive with carboxylic acid anhydrides and cannot be used to coordinate the catalyst in the case where the curing agent is an anhydride. On the other hand, anhydrides are not reactive with most of the other coordinating solvents such as N,N-dimethyl formamide and dimethyl sulfolane, and hence these solvents are useful in anhydride systems. In light of the present disclosure, those skilled in the art will be able to select an appropriate non-reactive volatile solvent for catalyst coordination in any given system.

The relative amount of organic polybasic acid to epoxy resin to be used depends to some extent upon the functionality of both epoxy resin and the acid as well as the precise properties desired in the final cured product. For tough, hard final cured products, at least some of the epoxy resin and/or polybasic acid should have a functionality greater than two. However, since both the epoxy resins and the polybasic acids are well-known to those skilled in the art, the selection of these proportions does not form a part of the present invention. The required proportions may be readily selected based upon the factors summarized above. Simply by way of illustration, glutaric acid is normally used in an amount of from about 60% to about 170% of stoichiometric as determined by allowing one carboxyl group per epoxy group.

The cured epoxy polymers obtained by the method of this invention have a wide range of uses in castings, moldings, adhesives, propellant binders, propellant motor liners, insulation materials and the like.

The following examples are presented solely to illustrate the invention and accordingly should not be regarded as limiting in any way. In the examples, the parts and percentages are by weight unless otherwise indicated.

EXAMPLE I

| | Grams |
|---|---|
| Methanol | 50 |
| Emery diacid (eq. wt. 1600) | 45 |
| Reichold triepoxide (eq. wt. 160) | 5 |
| Active chromium III 2-ethylhexanoate containing unoccupied coordination sites | 2 |

The chromium catalyst was prepared as follows. Active chromium III 2-ethylhexanoate, hexahydrate was dissolved in the parent acid (2-ethylhexanoic in this case) and then this solution was heated to 180° C. for two hours. The solution changed from a blue-violet color to an emerald green color. The excess 2-ethylhexanoic acid was then removed under vacuum to yield the active catalyst containing unoccupied coordination sites. Alternatively, the same effect can be produced in an inert solvent whose boiling point is greater than 180° C. by adding some of the parent acid to this solution. However, the time to form unoccupied coordination sites is lengthened since the rate is dependent to some extent on the acid concentration.

The Emery diacid used is the product of the reaction of neopentyl alcohol and azelaic acid in such ratio as to yield a polyester polymer difunctional in carboxylic acids, whose average equivalent weight is about 1000. This polymer, of course, can be prepared to yield practically any average equivalent weight desired. The Reichold triepoxide is a trifunctional epoxy resin prepared from the reaction of three moles of epichlorohydrin with one mole of trimethylol propane. The following is the theoretical formula of the resin:

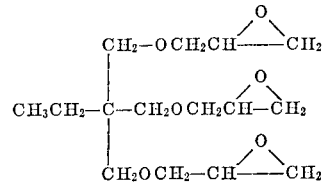

EXAMPLE II

| | Grams |
|---|---|
| N,N-dimethyl formamide | 50 |
| 1,2-butylene oxide | 4.5 |
| Methyl nadic anhydride | 45.5 |
| Chromium amine [two parts chromium III 2-ethylhexanoate (prepared as described above) and one part N,N-dimethylenzylamine] | 2.0 |

EXAMPLE III

| | Grams |
|---|---|
| Cab-O-Sil (silica gel—thickening agent) | 5.0 |
| CH₃OH | 25.0 |
| Empol 1043 Trimer acid (1–0) (trimerized unsaturated $C_{18}$ fatty acid) | 46.3 |
| CY–179 or ERL–4221 (100) (Bis-3,4-epoxy-6-methylcyclohexylmethyl adipate) | 21.6 |
| Chromium catalyst of Example I | 2.1 |

| Example number [1] | IV | V |
|---|---|---|
| Percent methanol | 20.0 | 25.0 |
| | Two inch bubble rise time, min. | |
| Storage time, days: | | |
| 0 | <.01 | <.01 |
| 1 | | |
| 2 | ~.01 | |
| 3 | ~.01 | <.01 |
| 4 | .01 | |
| 5 | .01 | |
| 6 | | .01 |
| 7 | .018 | .01 |
| 8 | .02 | |
| 9 | .027 | .01 |
| 10 | | .01 |
| 11 | | |
| 12 | .031 | .012 |
| 13 | | .016 |
| 14 | | .018 |
| 15 | .039 | .02 |
| 16 | | |
| 17 | | |
| 18 | | .026 |
| 19 | | |
| 20 | | |
| 21 | | |
| 22 | | .028 |
| 23 | | |
| 24 | | .030 |
| 25 | | |

[1] Binder system: Trimer acid (trimerized unsaturated $C_{18}$ fatty acid)/ 3,4-epoxycyclohexylmethyl(3,4-epoxy) cyclohexane carboxylate 100/100 eq. ratio. 3.0% active chromium III catalyst prepared as described in Example III.

EXAMPLE VI [1]

Percent methanol 25.0

| Storage time, days: | Two inch bubble rise, time, min. |
|---|---|
| 0 | <.01 |
| 1 | <.01 |
| 2 | --- |
| 3 | <.01 |
| 4 | .01 |
| 5 | .012 |
| 6 | --- |
| 7 | --- |
| 8 | .017 |
| 9 | --- |
| 10 | --- |
| 11 | .027 |
| 12 | --- |
| 13 | --- |
| 14 | --- |
| 15 | .030 |

[1] Binder System: Trimer acid (trimerized unsaturated $C_{18}$ Fatty acid)/bis-3,4-epoxy-6-methyl-cyclohexylmethyl adipate; 100/100 eq. ratio.

At room temperature the composition of Example I increases in viscosity by a factor of ten after four months storage. By contrast, when toluene replaces methanol in the above example, the same viscosity change takes place in one day. Yet the resulting cured films from both systems are indistinguishable one from the other. A salient feature of this invention is that the catalyst level in the resin after solvent leaves is double that in the starting solution. Since the rate of reaction depends on catalyst concentration, the rate of polymerization in the final film is greatly enhanced.

Having fully described our invention, it is intended that it be limited only by the lawful scope of the appended claims.

We claim:

1. A novel storable epoxy resin system comprising a curable epoxy resin and a carboxylic acid or acid anhydride curing agent; the improvement wherein the system is provided with a trivalent chromium III tricarboxylate salt catalyst having unoccupied coordination sites deactivated with a nonreactive volatile electron donating solvent, which solvent is adapted to evaporate upon application of the composition to a surface, reactivating the catalyst and resulting in the reaction of the epoxy compound with the carboxylic acid to acid anhydride.

2. A novel storable epoxy resin system comprising a curable epoxy resin and a carboxylic acid curing agent; the improvement wherein the system is provided with a trivalent chromium III tricarboxylate salt catalyst having unoccupied coordination sites deactivated with methanol, said methanol being adapted to evaporate upon application of the composition to a surface, reactivating the catalyst and resulting in the reaction of the epoxy compound with the acid.

3. The system of claim 1 wherein the solvent is N,N-dimethyl formamide.

4. The system of claim 1 wherein the solvent is tetrahydrofuran.

5. A novel storable epoxy resin system comprising a curable epoxy resin and a carboxylic acid or acid anhydride curing agent; the improvement wherein the system is provided with a trivalent chromium III tricarboxylate salt catalyst having unoccupied coordination sites deactivated with a non-reactive volatile electron donating solvent, which solvent is adapted to evaporate upon application of the composition to a surface, reactivating the catalyst and resulting in the reaction of the epoxy compound with the carboxylic acid or acid anhydride.

6. The method which comprises applying a novel storable epoxy resin system comprising a curable epoxy resin, a carboxylic acid or acid anhydride curing agent, and a trivalent chromium III tricarboxylate salt catalyst having unoccupied coordination sites deactivated with a non-reactive volatile electron donating solvent to a substrate, and permitting said solvent to volatilize to activate said catalyst and cure said resin.

7. The method which comprises applying a novel storable epoxy resin system comprising a curable epoxy resin, a carboxylic acid curing agent, and a trivalent chromium III tricarboxylate salt catalyst having unoccupied coordination sites deactivated with methanol to a substrate, and permitting said methanol to volatilize to activate said catalyst and cure said resin.

8. The method of claim 6 wherein the solvent is N,N-dimethyl formamide.

9. The method of claim 6 wherein the solvent is tetrahydrofuran.

References Cited
UNITED STATES PATENTS

| 3,385,835 | 5/1968 | Kugler et al. | 260—2 EA X |
| 3,427,255 | 2/1969 | Case | 260—2 EA X |
| 3,427,260 | 2/1969 | Maguet-Martin et al. | 252—431 X |

MORRIS LIEBMAN, Primary Examiner

L. T. JACOBS, Assistant Examiner

U.S. Cl. X.R.

260—2 EA, 32.6, 33.4 EP, 47 EA